United States Patent [19]

Kurata

[11] Patent Number: 4,970,585
[45] Date of Patent: Nov. 13, 1990

[54] METHOD AND APPARATUS FOR READING MULTICOLOR MANUSCRIPTS

[75] Inventor: Masami Kurata, Ebina, Japan
[73] Assignee: Fuji Xerox Co., Ltd., Tokyo, Japan
[21] Appl. No.: 338,391
[22] Filed: Apr. 14, 1989

Related U.S. Application Data

[63] Continuation of Ser. No. 120,775, Nov. 16, 1987, abandoned, which is a continuation-in-part of Ser. No. 620,257, Jun. 13, 1984, abandoned.

[30] Foreign Application Priority Data

Jun. 21, 1983 [JP] Japan .................................. 58-111468

[51] Int. Cl.$^5$ .......................... H04N 1/04; H04N 1/46
[52] U.S. Cl. ...................................................... 358/75
[58] Field of Search ........................... 358/75, 453, 452

[56] References Cited

U.S. PATENT DOCUMENTS

| 4,442,452 | 4/1984 | Kurata et al. | 358/75 |
| 4,469,433 | 9/1984 | Kurata et al. | 358/75 |
| 4,479,242 | 10/1984 | Kurata | 358/75 |
| 4,551,750 | 11/1985 | Kurata | 358/75 |
| 4,577,218 | 3/1986 | Kurata | 358/75 |

FOREIGN PATENT DOCUMENTS

| 53-8159 | 1/1978 | Japan | 358/75 |
| 13308 | 2/1978 | Japan . | |
| 53966 | 4/1980 | Japan . | |
| 95185 | 7/1980 | Japan . | |
| 125765 | 9/1980 | Japan . | |
| 57-17263 | 1/1982 | Japan | 358/75 |
| 162082 | 10/1982 | Japan . | |
| 2138244 | 10/1984 | United Kingdom | 358/75 |

Primary Examiner—John K. Peng
Assistant Examiner—Robert M. Bauer
Attorney, Agent, or Firm—Cushman, Darby & Cushman

[57] ABSTRACT

There are provided a plurality of light sources emitting different color lights, and switch means for selectively lighting either one or all of the light sources. The lights reflected by a multicolor manuscript are converted into electric outputs by an image sensor. The output of the image sensor of the portion of the manuscript having the same color as the lighted light source is caused to exceed a predetermined binarizing level, whereby that portion of the manuscript is prevented from being read.

5 Claims, 3 Drawing Sheets

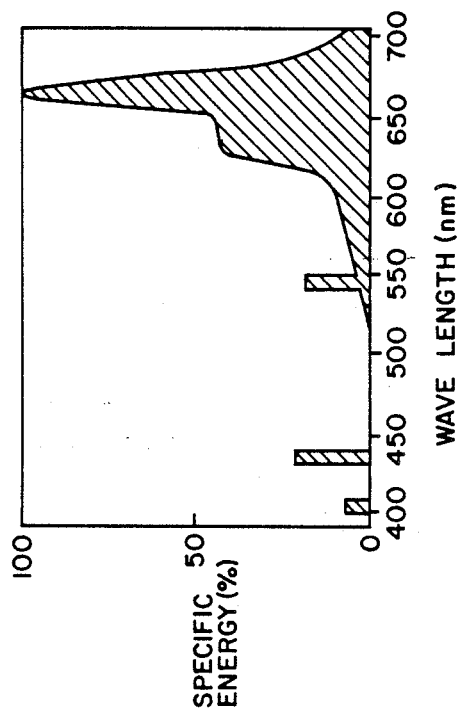
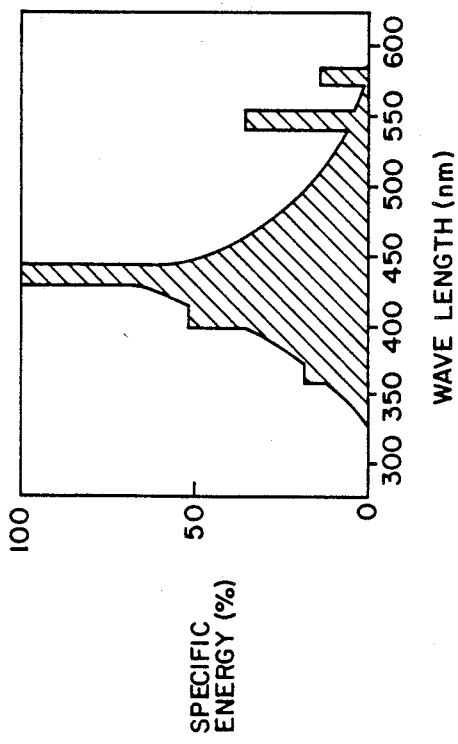

METHOD AND APPARATUS FOR READING MULTICOLOR MANUSCRIPTS

This is a continuation of application Ser. No. 07/120,775, filed Nov. 16, 1987, which was a continuation of Ser. No. 06/620,257 which was abandoned upon the filing hereof filed June 13, 1984 now abandoned.

BACKGROUND OF THE INVENTION

1. Field of the Invention

This invention relates to a method and apparatus for reading a multicolor manuscript utilized in a copying machine, a facsimile device or the like, and more particularly a method and apparatus for reading a multicolor manuscript by cutting off or elimination a picture information regarding a specific color.

2. Description of the Prior Art

FIG. 1 is a diagrammatic representation showing a prior art apparatus for reading a manuscript utilized in a copying machine, a facsimile device or the like. The manuscript reading device shown in FIG. 1 comprises a glass plate 1, an illuminating lamp 2, a reflection mirrors 3 and 4, a lense 5, an image sensor 6, a signal processing circuit unit 7 and an illuminating lamp drive circuit 8. A manuscript to be read is mounted on the glass plate 1 and then a switch 81 of the illuminating lamp drive circuit 8 is operated to light the lamp 2 to illuminate the manuscript. The light reflected by the manuscript is received by the image sensor 6 through reflection mirrors 3 and 4, and the lens 5. A photoelectrically converted output corresponding to the picture image pattern of the manuscript and produced by the image sensor 6 is applied to a binarizing circuit, not shown, of the signal processing circuit unit 7 to convert the photoelectrically converted output into a binary signal of a definite level, thus reading the picture information of the manuscript. As is well known in the art, the prior art manuscript reading apparatus of the type described above is designed such that even when the manuscript to be read is multicolor namuscript in which black, blue, red or other color picture informations coexist, the illumination lamp 2 is selected to have such light wavelength characteristic that the image sensor 6 can produce uniform photoelectrically converted outputs not only for black color picture information but also for other color picture informations so as to read picture informations of blue, red or other colors. Where remarks or row lines, etc. of the multicolor manuscript are written or printed with blue or red color, and where the operator wants to record the manuscript with these remarks or row lines, the prior art manuscript reading apparatus reads also the picture information of blue or red color. Accordingly, there was a problem that such manuscript reading apparatus could not obtain a recorded picture image from which blue or red color picture informations have been erased. Where it is desirable to obtain such recorded picture image erased with a picture information of a specific color, such recorded picture image can readily be obtained by using a color manuscript reading apparatus capable of reading respective colors of a multicolor picture informations and then suitably cutting off or eliminating read picture signals of the specific color. However, such multicolor reading apparatus is generally expensive and inconvenient to use.

SUMMARY OF THE INVENTION

Accordingly, it is an object of this invention to provide a method and apparatus capable of readily obtaining a recorded picture image eliminated with a specific color or colors without utilizing an expensive color manuscript reading apparatus.

According to one aspect of this invention, there is provided a method of reading a multicolor manuscript comprising the steps of preparing at least two light sources emitting lights of different colors and an image sensor photoelectrically converting received lights into electric outputs; selectively lighting either one of the light source or simultaneously lighting all of the light sources for scanning the multicolor manuscript, and receiving light emitted by the lighted light source and reflected by the multi-color manuscript with the image sensor so as to cause a level of an output of the image sensor corresponding to a specific color of the light emitted by the lighted light source to exceed a predetermined level so as not to read the specific color.

According to another aspect of this invention, there is provided multicolor manuscript reading apparatus comprising means for supporting the multicolor manuscript; at least two light sources emitting lights of different colors; optical means for scanning the multicolor manuscript with lights emitted by the light sources; means for selectively lighting either one or a plurality of the light sources; an image sensor for converting lights reflected by the multicolor manuscript into electric outputs; and means for binarizing the electric outputs into bianry signals in accordance with a predetermined binarizing level; the binarizing means causing the electric output of the image sensor corresponding to a specific color of the light emitted by the lighted light source to exceed the predetermined binarizing level, thus preventing the specific color from being read.

BRIEF DESCRIPTION OF THE DRAWINGS

In the accompanying drawings:

FIG. 3a and 3b are graphs showing spectrum distributions of lamps emitting different colors.

DESCRIPTION OF THE PREFERRED EMBODIMENT

Figure 1:
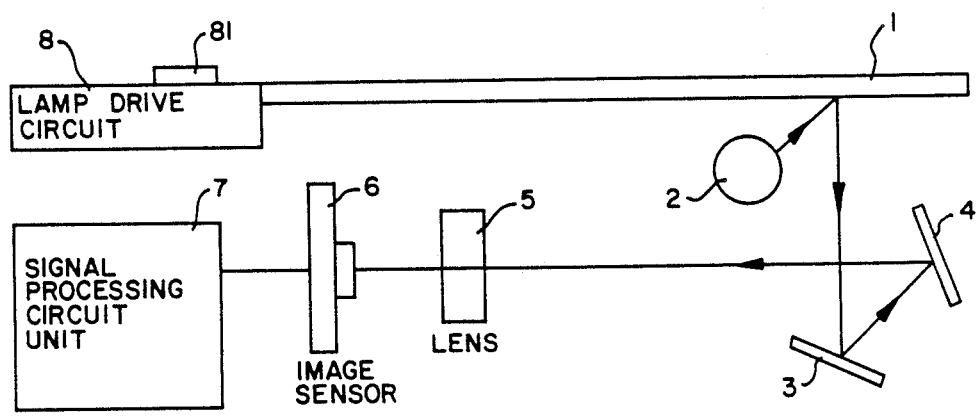
FIG. 1 is a diagrammatic representation showing one example of a prior art manuscript reading apparatus.
Figure 2:
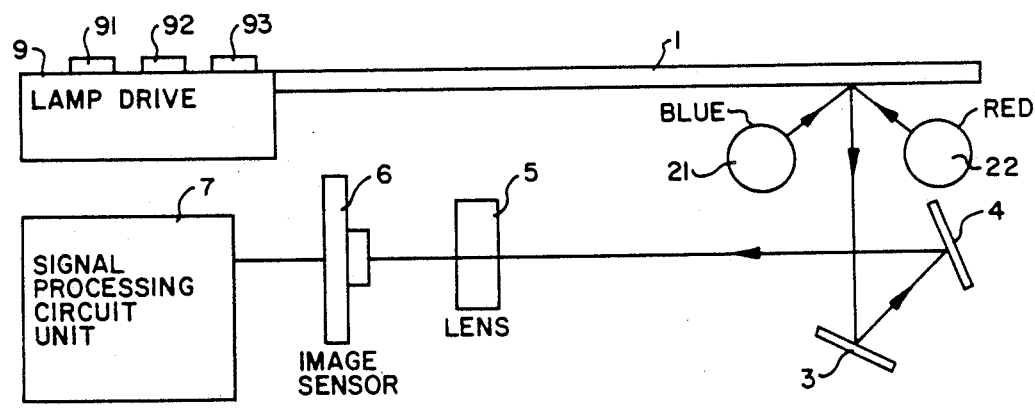
FIG. 2 is a diagrammatic representation showing one example of the manuscript reading apparatus embodying the invention.

A preferred embodiment of this invention will now be described with reference to FIG. 2 in which component elements corresponding to those shown in FIG. 1 are designated by the same reference numerals. According to this invention, there are added two source lamps emitting different colors, namely a blue light source lamp 21 and a red light source lamp 22, and a drive circuit 9 for selectively driving the source lamps 21 and 22. The selective drive circuit 9 is provided with a drive switch 91 for the blue light source lamp 21 and a drive switch 92 for the red light source lamp 22, and a drive switch 93 for driving both lamps. By selectively operating these drive switches either one of the blue and red light source lamps 21 and 22 can be lighted or both lamps can be simultaneously lighted. Where blue light source lamp 21 and the red light source lamp 22 are independently lighted by independently operating switches 91 and 92, spectrum distributions as shown in FIGS. 3a and 3b can be obtained. As shown, the spectrum intensities are extremely large near wavelengths of 430 nm and 670 nm respectively.

Figure 4A:
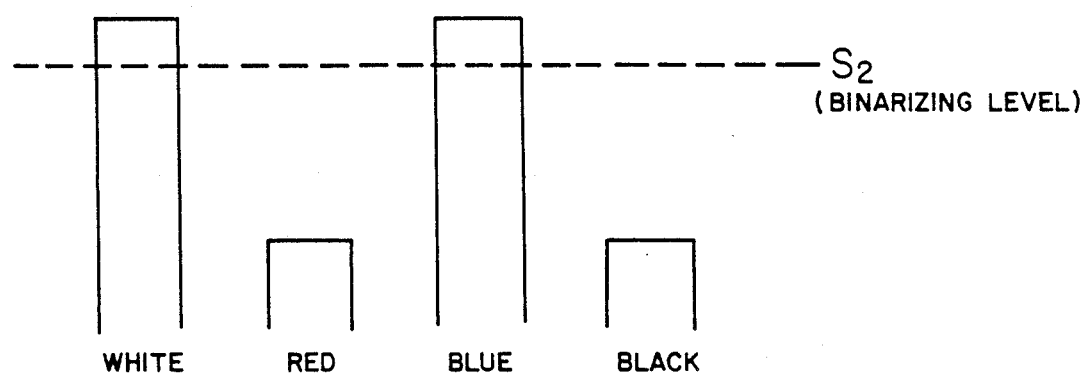
FIG. 4a, 4b and 4c are bar graphs showing the outputs of the image sensors corresponding to white, red, blue and black color lights.
Figure 4B:
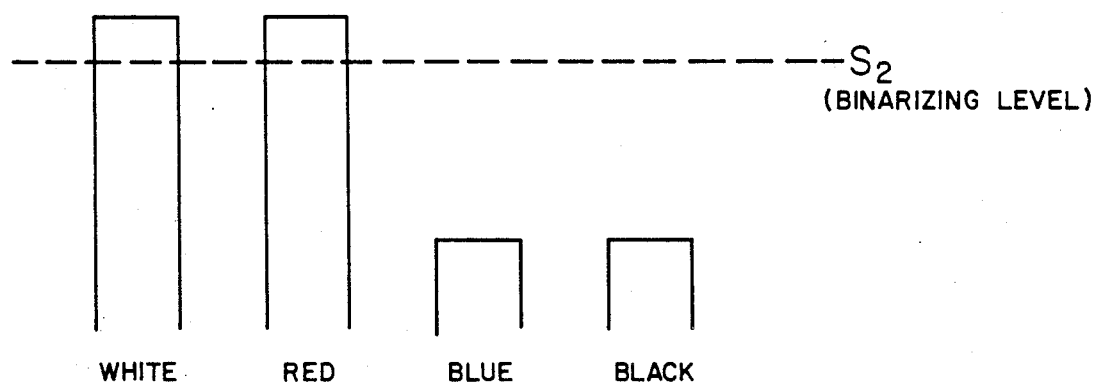
Figure 4C:
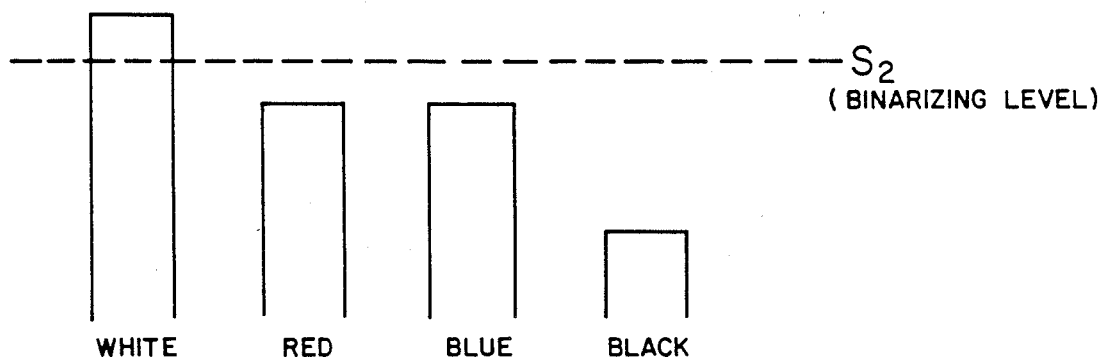

FIGS. 4a, 4b and 4c are Bar graphs showing the photoelectrically converted output levels of the image sensor 6 corresponding to respective color picture informations contained in a multicolor manuscript when the switches 91, 92 and 93 are selectively operated for independently or simultaneously lighting the blue light source lamp 21 and the red light source lamp 22 so as to scan the multicolor manuscript mounted on the glass plate 2. More particularly, when only the blue light source lamp 21 is lighted to scan the multicolor manuscript, the photoelectrically converted outputs of the image sensor 6 corresponding to respective color picture informations of white, red, blue and black colors of the manuscript are shown in FIG. 4a. As shown, the output levels of the image sensor 6 with respect to white and blue colors become higher than binarizing level $S_2$ which is determined in the signal processing circuit unit 7 according to the white level (the output signal level of the image sensor 6 when the image sensor reads a reference white portion on the manuscript or on the glass plate 1 at the start of the scanning). As a consequence, the red and black color picture informations are detected by the binarizing circuit inputted with the photoelectrically converted outputs of the image sensor 6, whereas the picture information of blue color would not be detected as a picture signal. In the same manner, where only the red color light source lamp 22 is lighted to scan the multicolor manuscript, as shown in FIG. 4b, the photoelectrically converted outputs of the image sensor exceed the binarizing level $S_2$ for the white and red color picture informations so that the blue and black color picture informations would be detected as picture signals, but the red color picture information would not be binarized, whereby it would not be detected as a picture signal. When the blue color light source lamp 21 and the red color light source lamp 22 are simultaneously lighted to scan the multicolor manuscript, the photoelectrically converted outputs of the image sensor 6 corresponding to respective color picture informations would be shown by FIG. 4c. Thus, only the white color picture information exceeds the binarizing level $S_2$ with the result that the red, blue and black color picture informations would be detected as picture signals. As above described, where the blue color light source lamp 21 and the red color light source lamp 22 are independently lighted to scan the multicolor manuscript, since the spectrum distribution of the picture informations of the same colors as those emitted from the lamps 21 and 22 are improved, the photoelectrically converted outputs of the image sensor 6 exceed the binarizing level S for the blue and red color picture informations so that these output would not be detected as picture signals. On the other hand, the photoelectrically converted outputs of the image sensor 6 of the color picture informations of the complementary color components of the colors emitted from respective lamps are stable so that the picture informations can readily be binarized, thus improving the accuracy of detection of the picture signals. Where both of the blue and red color light source lamps 21 and 22 are simultaneously lighted, the spectrum sensitivity of the image sensor for blue and red colors becomes adequate so that the blue and red color picture informations would not be eliminated but detected as picture signals. The description described above can be summarized as shown in the following Table.

TABLE

| lamp lighted | color read | |
|---|---|---|
| | blue | red |
| blue | impossible to read | good |
| red | good | impossible to read |
| blue and red | normal | normal |

As above described, where drive switches 91, 92 and 93 are selectively operated to light any desired light source lamp for scanning the multicolor manuscript only a specific picture information of the same color as that emitted by the lighted lamp can be selectively read.

What is claimed is:

1. A method of reading a manuscript while selectively cutting off image information of a predetermined color, comprising the steps of:
    continuously irradiating the manuscript to be read with light from a light source emitting the predetermined color so as to produce from the image information of the manuscript reflected light in which a level of reflected light corresponding to the predetermined color is greater than that other colors;
    producing a picture signal corresponding to the reflected light by reading the reflected light from the manuscript; and
    forming binarized image information in which image information corresponding to the color of the light source is only selectively excluded from the image information of the manuscript, by comparing the produced picture signal with a predetermined threshold level determined according to the white level of the picture signal;
    whereby a picture exclusive of the predetermined color is produced.

2. The method of claim 1, wherein the color of the light source is red color, and wherein the step of forming the binarized image information forms the binarized image information in which image information corresponding to the red color is selectively excluded from the image information of the manuscript.

3. The method of claim 1, wherein the color of the light source is blue color, and wherein the step of forming the binarized image information forms the binarized image information in which image information corresponding to the blue color is selectively excluded from the image information of the manuscript.

4. A manuscript reading apparatus for reading a manuscript while selectively cutting off image information of a predetermined color, comprising:
    at least one light source for producing light of the predetermined color;
    scanning means for continuously lighting the light source and producing reflected light in which a level of reflected light corresponding to the predetermined color is greater than that other colors from the image information of the manuscript, by scanning the manuscript to be read by means of light from the light source;
    picture signal producing means for converting the reflected light from the manuscript into a picture signal corresponding to the reflected light; and binarized image information forming means for forming binarized image information in which image information corresponding to the color of the light source is only selectively excluded from the image information of the manuscript; by comparing the picture signal produced by the picture signal producing means with a predetermined threshold level determined according to the white level of the picture signal.

5. The apparatus of claim 4, wherein the light source comprises a first light source of red color and a second light source of blue color, and wherein the binarized image information forming means, in the case where the first light source is being lit, forms binarized image information in which image information corresponding to the red color is selectively excluded from the image information of the manuscript, in the case where the second light source is being lit, forms binarized image information in which image information corresponding to the blue color is selectively excluded from the image information of the manuscript, and in the case where the first and second light sources are being lit, forms binarized image information containing image information of the red and blue colors.

* * * * *